M. BITTRICH.
MEASURING FEED DEVICE FOR RETORTS AND THE LIKE.
APPLICATION FILED JAN. 14, 1907.

938,954.

Patented Nov. 2, 1909.
3 SHEETS—SHEET 2.

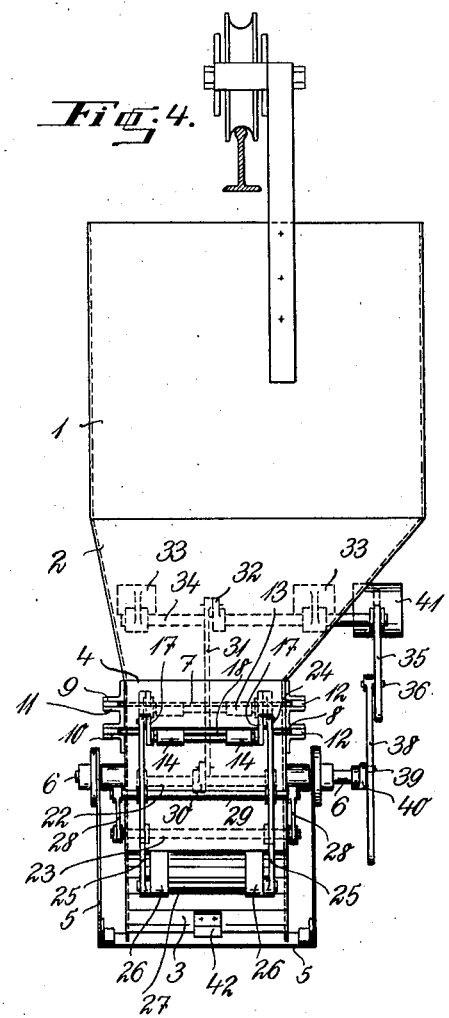
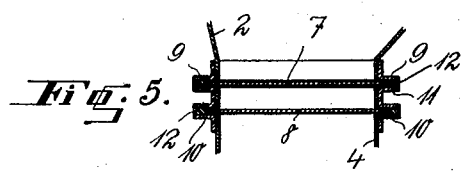

UNITED STATES PATENT OFFICE.

MAX BITTRICH, OF STETTIN, GERMANY.

MEASURING FEED DEVICE FOR RETORTS AND THE LIKE.

938,954.          Specification of Letters Patent.        Patented Nov. 2, 1909.

Application filed January 14, 1907. Serial No. 352,143.

*To all whom it may concern:*

Be it known that I, MAX BITTRICH, a subject of the Emperor of Germany, and a resident of Stettin, Germany, have invented certain new and useful Improvements in Measuring Feed Devices for Retorts and the Like, of which the following is a specification.

My invention relates to feed mechanism for furnaces, retorts and the like, in which the amount fed is measured, so that the charge will always be of the same quantity. Devices of this character comprise a storage receptacle and a measuring receptacle adapted to receive its charge from the storage receptacle, and to thereupon transfer this charge to the furnace or retort. The manipulation of such devices at the proper time has hitherto required the close attention of the operator.

My present invention has for its object to so construct the apparatus that automatic means will be provided for insuring the opening and closing of each of the receptacles at the proper time, that is, the mechanism is so constructed that no material can pass from the storage receptacle to the measuring receptacle unless the outlet of the measuring receptacle is first closed, and that no material can pass from the storage receptacle to the measuring receptacle when the latter is opened to discharge its contents.

A practical embodiment of my present invention is shown in the accompanying drawings in which—

Figure 1:
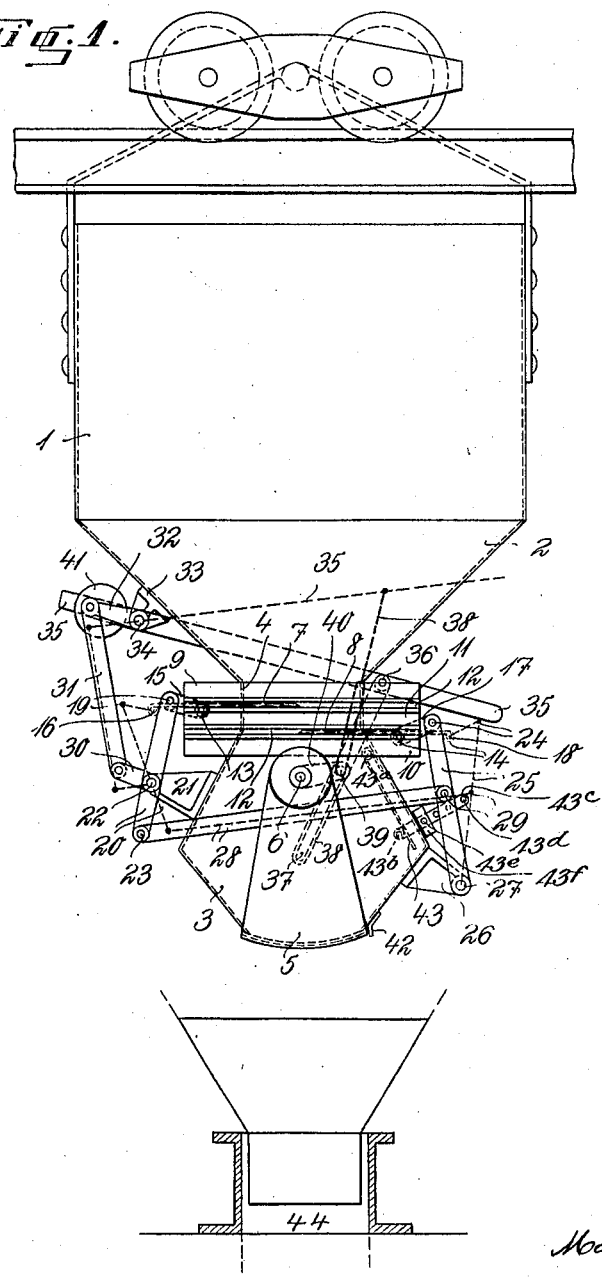
Figure 2:
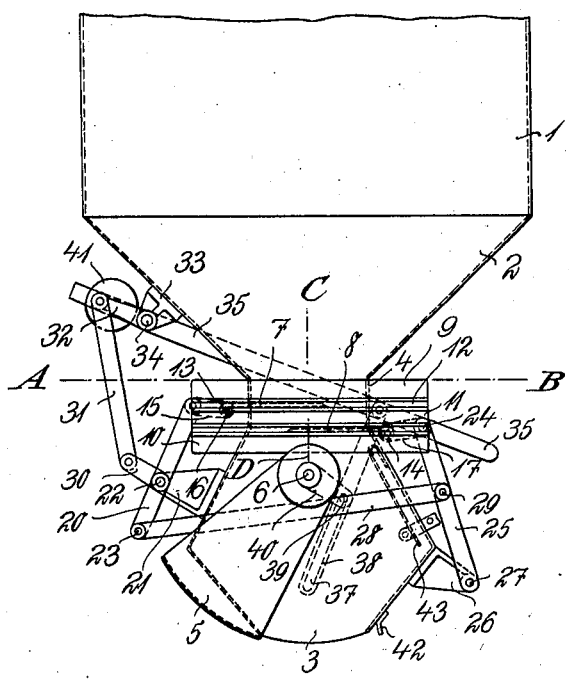
Figure 3:
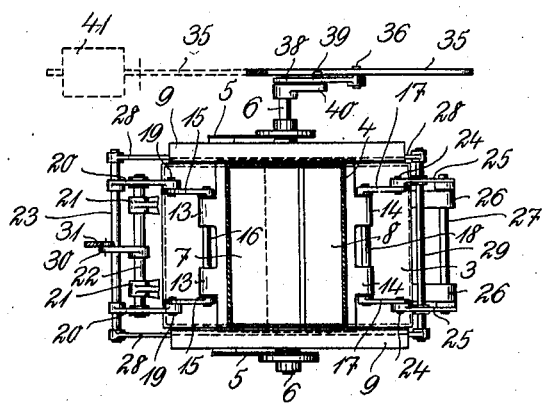

Figure 1 is a side elevation of the apparatus with both receptacles closed; Fig. 2 is a partial side elevation showing the measuring receptacle open; Fig. 3 is a horizontal section on line A—B of Fig. 2; Fig. 4 is an end elevation of the apparatus, and Fig. 5 is a partial vertical section on line C—D of Fig. 2.

In the particular construction shown, the storage receptacle is represented as a carriage suspended from a truck running on rails. This receptacle has a body 1 and a tapering bottom 2, with which the measuring receptacle 3 is connected by a throat 4. The construction is such that when the throat 4 is open, the contents of the storage receptacle will pass quickly to the measuring receptacle. The outlet of the measuring receptacle is normally closed by a swinging gate 5, carried by a shaft 6 which extends through the measuring receptacle. A cut-off device is employed between the storage receptacle and the measuring receptacle, and this device consists of two slides 7, 8, working horizontally in the throat 4. As shown in Fig. 5, the guides in which the slides 7, 8 move, may be formed by means of angle irons 9, 10, and a U-bar 11, with distance pieces 12 interposed between the angle irons and the U-bars. The slides 7, 8 are located at different levels and project from the apparatus at opposite sides and are connected by mechanism, to be described presently, in such a manner that they will move in opposite directions. Thus the slides 7, 8 may open or close the passage through the throat 4, and they may even project one above the other so as to overlap as indicated in Fig. 2. In order that the slides may readily pass through the material, their inner edges are sharpened. At their outer ends the slides are provided with ears 13 and 14 (see Fig. 3), receiving pivot rods 16 and 18 respectively, which carry links 15 and 17 respectively. The outer ends of the links are pivotally connected by means of pins 19, 24 with levers 20, 25 respectively. These levers are mounted on shafts 22, 27 respectively, journaled in brackets 21, 26 respectively. The levers 20 are connected below their pivots by a rod 23 and the levers 25 are connected above their pivots by a rod 29. These two rods are linked together by connecting rods 28, extending at each side of the measuring receptacle 3, as indicated in Figs. 3 and 4. This mechanism insures a uniform motion of the slides 7, 8 in opposite directions.

On the shaft 22 to which the levers 20 are secured rigidly, is arranged a crank arm 30, connected by a link 31 with a crank arm 32 projected from a rock shaft 34 journaled in brackets 33. This rock shaft is further provided with an operating lever 35 adapted to be worked by hand and having pivotally secured to it at 36 a depending bar 38. This bar is provided with a longitudinal slot 37 into which projects a pin 39 secured to a crank 40, which is carried by the shaft 6 of the swinging gate 5. A balancing weight 41 is applied to the lever 35 so that the said lever, together with the bar 38 will be in equilibrium. The proportions of the parts, and particularly the location of the pivot 36 and the length of the slot 37 are such that if the operating lever 35 is moved from the position shown in full lines in Fig.

1 to that indicated by dotted lines, this will have no effect on the position of the gate 5, which remains closed by its own weight.

42 is a stop to limit the movement of the swinging gate 5 and 43 is an adjustable wall for varying the volume of the measuring receptacle. This wall may for instance be pivoted at its upper end 43$^a$ and pivotally connected at 43$^b$ with an adjusting rod 43$^c$ which has a series of openings 43$^d$ any one of which may receive a locking pin 43$^e$ also passing through an aperture in a bracket 43$^f$ secured to the receptacle 3.

In operation, the parts being in the position illustrated by solid lines in Fig. 1, and the measuring receptacle being empty, while the storage receptacle contains material to be fed to the retorts or other apparatus, the material cannot pass from the storage receptacle to the measuring receptacle as the slides 7 and 8 have their inner edges in vertical alinement. In order to fill the measuring receptacle, the lever 35 is then first moved upward to the position indicated by dotted lines. This, as previously explained, does not affect the position of the swinging gate 5, since the pin 39 merely slides in the slot 37. The connection by means of the link 31 and crank arm 30, rocks the shaft 22 and also the shaft 27, owing to the provision of the connecting rods 28, and thus the levers 20, 25 are moved apart at their upper ends, this causing the slides 7 and 8 to clear the throat 4 for the passage of the material from the storage receptacle 1 to the measuring receptacle 3. The pin 39 is in engagement with the arm 38 at the lower end of the slot 37, so that the gate 5 cannot move accidentally while the material is passing into the measuring receptacle. When the device has been brought over the retort 44 or other apparatus to be charged, the lever 35 is moved downward into the position illustrated by Fig. 2. During the first part of this movement, from the position shown in dotted lines in Fig. 1, to that shown in solid lines in the same figure, the pin 39 will slide in the slot 37 and the gate 5 will remain stationary, but the slides 7, 8 will be moved toward each other so as to reach the position shown in Fig. 1. The connection between the storage receptacle and the measuring receptacle is thus interrupted before the gate 5 begins to open. During the further downward movement of the lever 35 the upper end wall of the slot 37 presses the pin 39 downward, and thus swings the gate into the open position illustrated by Fig. 2. At the same time the inward movement of the slides 7 and 8 is continued causing them to overlap as shown, so that any trickling of the material from the storage receptacle into the measuring receptacle is prevented. When the lever 35 is swung back to the position shown by solid lines in Fig. 1, the gate 5 will close by its own weight. In some cases the weight of the swinging gate might be sufficient to also return the operating lever 35 to its normal position when released.

While I have shown the apparatus constructed as a carriage, adapted to move on a track, I do not desire to restrict myself to this particular feature.

The number of the cut-off slides may be varied and other modifications may be made without departing from the nature of my invention as defined in the claims.

I claim as my invention:—

1. The combination with the storage receptacle and the measuring receptacle adapted to communicate therewith, of a swinging gate controlling the outlet of the measuring receptacle, a cut-off device controlling the communication of the storage receptacle with the measuring receptacle, a crank pin connected with the swinging gate, an actuating lever operatively connected with the cut-off device, and a bar pivotally connected with said lever and provided with a longitudinal slot into which said crank pin projects.

2. The combination of the measuring receptacle, the swinging gate controlling the outlet of said receptacle, the storage receptacle located above the measuring receptacle and adapted to communicate therewith, slides movable in opposite directions between the two receptacles, and controlling their communication, connected levers for moving said slides, an actuating lever operatively linked to said connected levers, and a loose connection from said actuating lever to the swinging gate.

In testimony whereof, I have hereunto signed my name in the presence of two subscribing witnesses.

MAX BITTRICH.

Witnesses:
E. H. EMERSON,
GEO. GILISQUIST.